United States Patent Office 2,925,364
Patented Feb. 16, 1960

2,925,364
METHOD OF TREATING HYPERCHOLESTEROLEMIA WITH d-THYROXINE

Lavon D. Bechtol, Far Hills, N.J., assignor to Baxter Laboratories, Inc., Morton Grove, Ill., a corporation of Delaware No Drawing. Application August 12, 1957
Serial No. 677,777

6 Claims. (Cl. 167—55)

This invention relates to a medicinal composition and, more particularly, to a composition useful in lowering excessive plasma cholesterol levels.

Excessive blood cholesterol levels, in addition to being considered undesirable per se, have been indicted as the precursors of a number of body ailments. Therefore, any means for lowering such levels is desirable.

It is, therefore, an object of this invention to provide a composition for lowering excessive plasma cholesterol levels. Another object is to provide a medicinal composition of the character specified in the foregoing object which is suited for oral administration. Other objects and advantages of this invention will be seen as this specification proceeds.

An important feature of this invention involves the use of dextro-thyroxine and the salts thereof in regulating plasma cholesterol levels. Contrary to expectation, the effect of these compositions is surprisingly greater than what might be anticipated from the effect of causing a small increase in metabolic rate—especially when compared with compositions including levo-thyroxine for these effects.

Lowering of the plasma cholesterol level can be obtained through daily doses of dextro-thyroxine and the salts thereof in the range from about 0.5 to about 10 milligrams.

Satisfactory results in achieving the objects of this invention are provided through oral administration of the medicinal compositions set forth above. Illustrative of a formulation suitable for this purpose is that set forth in the following table:

Table

| Ingredient | Amount | Purpose |
| --- | --- | --- |
| Sodium D-thyroxine | 1.0 mg | Active ingredient. |
| Lactose | 62.8 mg | Filler. |
| Powdered Sugar | 62.8 mg | Filler. |
| Magnesium Stearate | 1.08 mg | Lubricant. |
| Mineral Oil | 0.0092 cc | Lubricant. |
| Talc | 2.9 mg | Filler and lubricant. |
| 5% Acacia Solution | Qty. sufficient | Binder. |

In the compounding of a tablet suitable for oral administration of dextro-thyroxine and the salts thereof, such as the sodium salt, carbohydrate materials such as lactose and powdered sugar, are considered eminently suited. Alternatively, satisfactory results are obtainable through incorporating the d-thyroxine in elixirs and in parenteral vehicles.

The foregoing description has been given for clearness of understanding only, and no unnecessary limitations are to be inferred therefrom.

I claim:
1. The method of treating hypercholesterolemia in humans without substantially increasing metabolic rates, which comprises administering to said humans a compound consisting essentially of a member selected from the group consisting of d-thyroxine and the therapeutically active salts thereof.

2. The method of treating hypercholesterolemia in humans, which comprises administering to said humans a member selected from the group consisting of d-thyroxine and the therapeutically active salts thereof, said member being substantially free of significant calorigenic amounts of l-thyroxine and the salts thereof.

3. The method of treating hypercholesterolemia in humans without substantially increasing metabolic rates, which comprises administering to said humans in a daily dosage of from about 0.5 to 10 milligrams a compound consisting essentially of a member selected from the group consisting of d-thyroxine and the therapeutically active salts thereof.

4. The method of treating hypercholesterolemia in humans, which comprises administering to said humans in a daily dosage of from about 0.5 to 10 milligrams a member selected from the group consisting of d-thyroxine and the therapeutically active salts thereof, said member being substantially free of significant calorigenic amounts of l-thyroxine and the salts thereof.

5. The method of treating hypercholesterolemia in humans, which comprises administering to said humans d-thyroxine substantially free of significant calorigenic amounts of l-thyroxine.

6. The method of treating hypercholesterolemia in humans, which comprises administering to said humans d-thyroxine in a daily dosage of from about 0.5 to 10 milligrams, said d-thyroxine being substantially free of significant calorigenic amounts of l-thyroxine.

References Cited in the file of this patent

Chem. Abst., vol. 48, 1954, pp. 3545a, 10164i and 10165a.

U.S. Disp., 25th ed., 1955, Lippincott Co., Phila., pp. 1901, 1902.

Eriksson: Proc. Soc. Exp. Biol. and Med., vol. 94, No. 3, March 1957, pp. 582–584.

Univ. of Calif. Radiation Lab., No. 3534, September 1956, pp. 10 and 16.